Aug. 16, 1966   R. L. HOMSHER   3,266,359
SHEET MATERIAL TRIMMING AND INSPECTION APPARATUS
Filed May 15, 1964   6 Sheets-Sheet 2
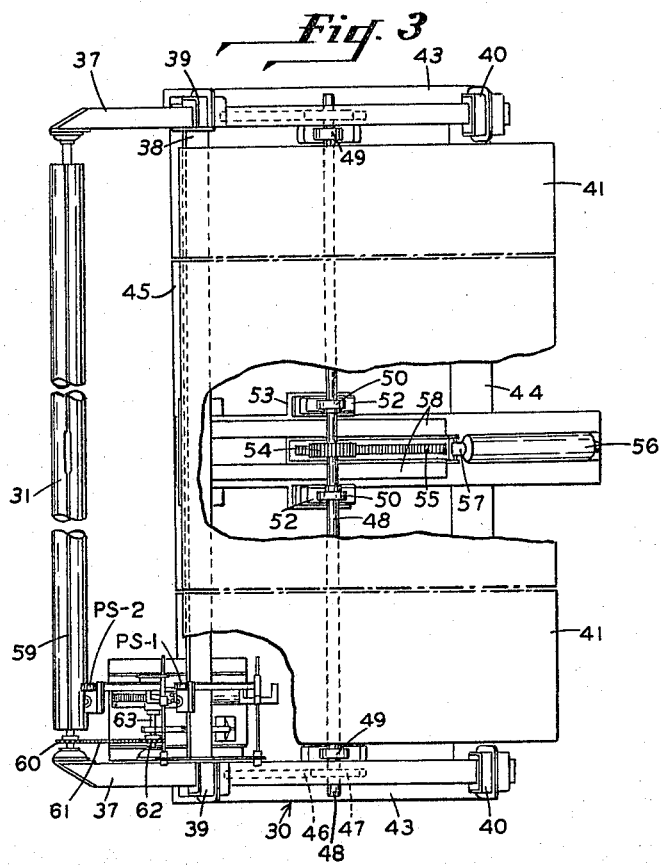
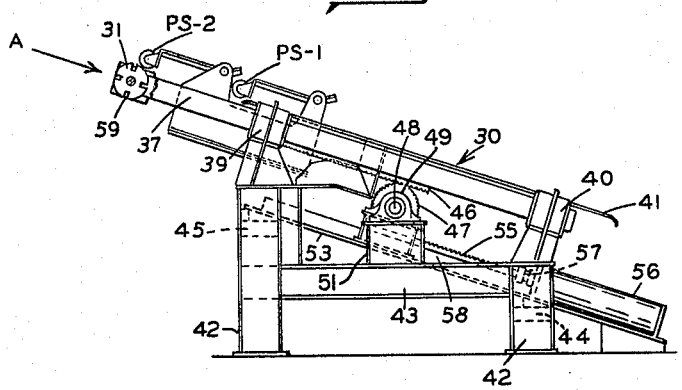
INVENTOR
RUFUS LEE HOMSHER
BY
ATTORNEY Aug. 16, 1966 R. L. HOMSHER 3,266,359
SHEET MATERIAL TRIMMING AND INSPECTION APPARATUS
Filed May 15, 1964 6 Sheets-Sheet 3

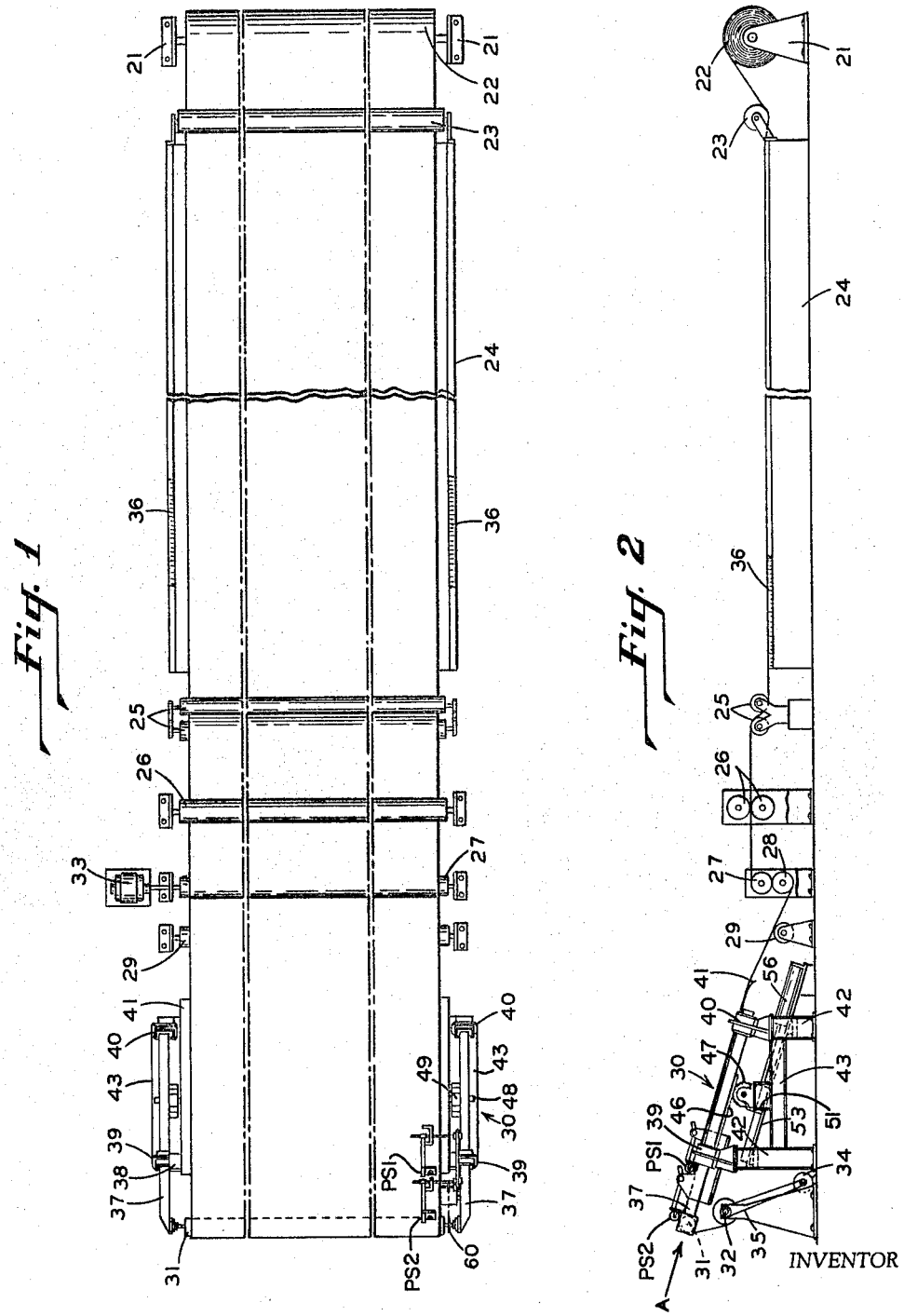

INVENTOR
RUFUS LEE HOMSHER

BY
ATTORNEY

Aug. 16, 1966   R. L. HOMSHER   3,266,359
SHEET MATERIAL TRIMMING AND INSPECTION APPARATUS
Filed May 15, 1964   6 Sheets-Sheet 4
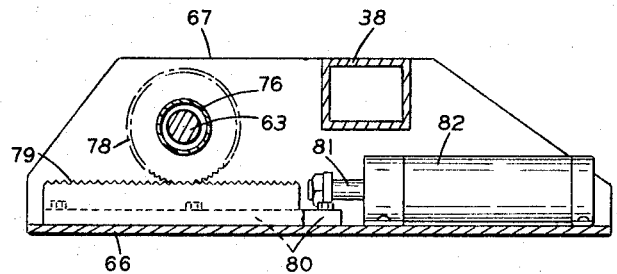
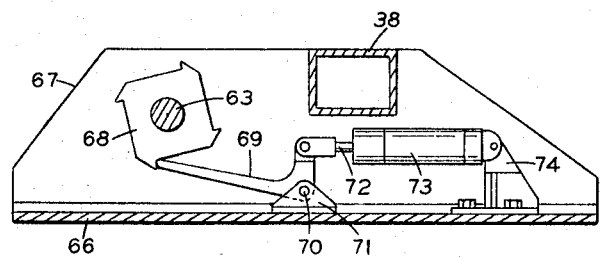
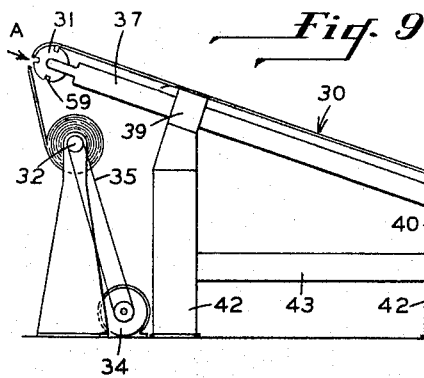
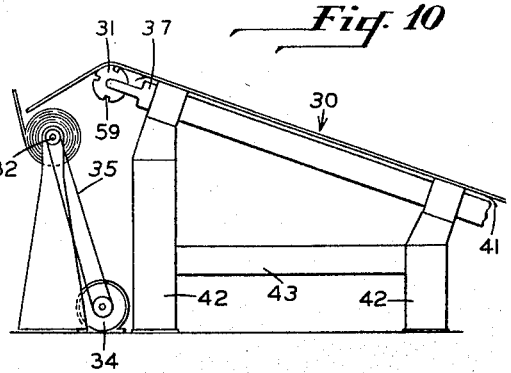
INVENTOR
RUFUS LEE HOMSHER
BY
ATTORNEY Aug. 16, 1966  R. L. HOMSHER  3,266,359
SHEET MATERIAL TRIMMING AND INSPECTION APPARATUS
Filed May 15, 1964  6 Sheets-Sheet 5

INVENTOR
RUFUS LEE HOMSHER

BY Stephen S. Kusting
ATTORNEY

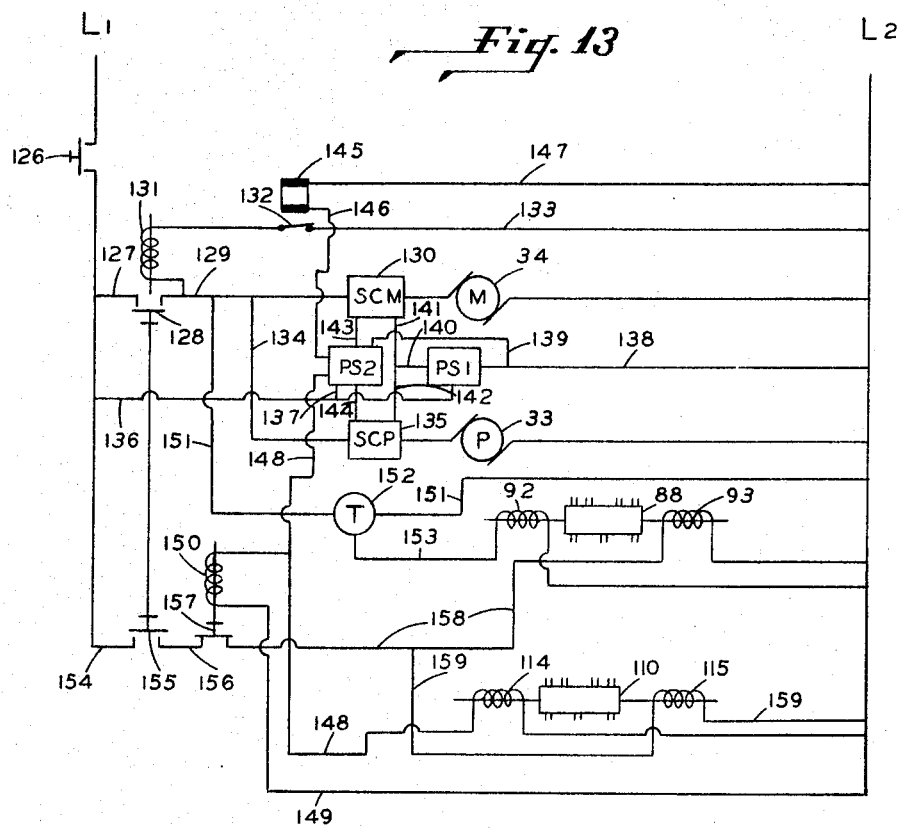

ёunited States Patent Office 3,266,359
Patented August 16, 1966

3,266,359
SHEET MATERIAL TRIMMING AND
INSPECTION APPARATUS
Rufus Lee Homsher, Lancaster Township, Lancaster
County, Pa., assignor to Armstrong Cork Company,
Lancaster, Pa., a corporation of Pennsylvania
Filed May 15, 1964, Ser. No. 367,822
11 Claims. (Cl. 83—367)

This invention relates to sheet material trimming and inspection apparatus and more particularly to a retractable, channeled, support roller, collection mandrel, edge trimmer, and graduated inspection table.

It has been the practice in the inspection of sheet material having great length to draw said sheet material over an elongated inspection table. While the material is drawn across the table, inspectors may visually or by other means check said material for flaws and scrap. The visual method has been used for the inspection of such sheet material as floor or wall coverings, for example. In any event, when flaws or scrap are found in certain areas of an elongated sheet of material, such areas usually must be removed from the remainder of the material. This removal is usually accomplished by some sort of trimming operation. In most cases, the movement of material across the table will cease during trimming operations. It should also be noted that periodic trimming will be provided in order to obtain desired, salable lengths of quality sheet material even if there are no flaws or scrap therein. The amount of material (length and area) which passes inspection along with that which is scrapped usually must be recorded for quality control, production, sales, packaging, and other purposes.

It is an object of the present invention to provide inspection apparatus for sheet material wherein the amount of material which is inspected and scrapped or approved may be readily determined.

It is another object of the present invention to provide a retractable, channeled, support roller for sheet material wherein cutting or trimming means may be drawn through channels in said support roller to sever said sheet material.

It is another object of the present invention to provide an indexing mechanism for a channeled support roller.

Figure 5:
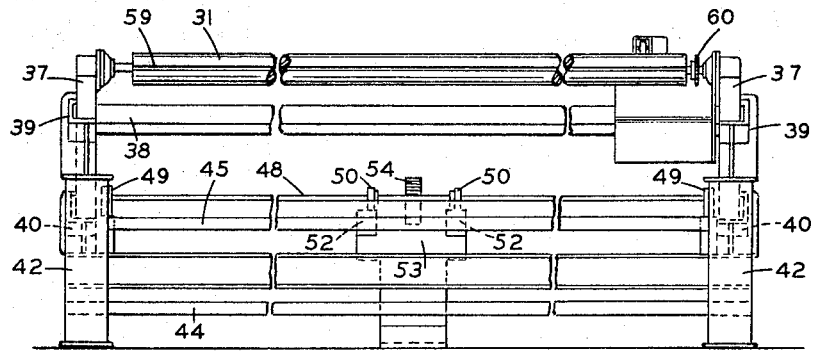
Figure 6:
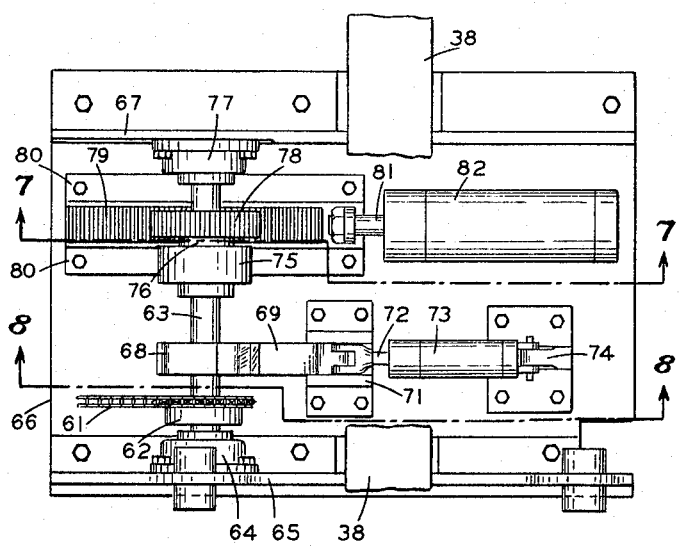
Figure 11:
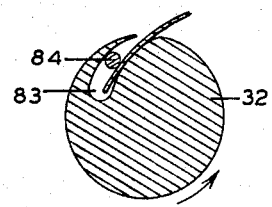
Figure 12:
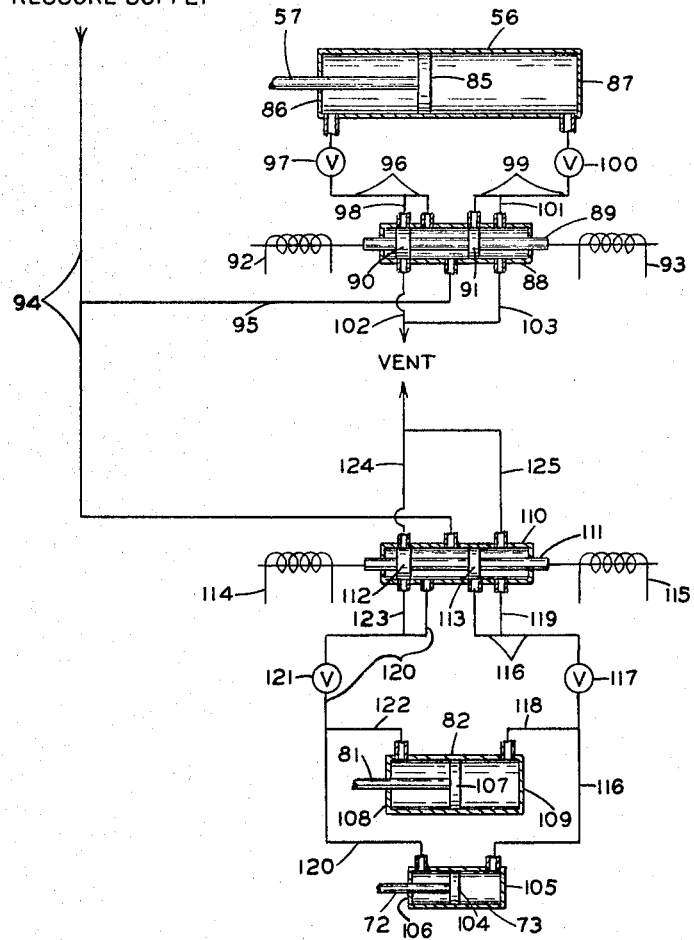

Other objects of the present invention will be readily apparent from the following description of an embodiment thereof as shown in the attached drawings in which FIGURE 1 is a plan view of the entire device;
FIGURE 2 is a view in elevation of the entire device;
FIGURE 3 is a plan view of a channeled, retractable support roller and cooperating table, certain portions of which have been broken away;
FIGURE 4 is a view in elevation of the support roller and table shown in FIGURE 3;
FIGURE 5 is a front view in elevation of the support roller and cooperating table shown in FIGURES 3 and 4;
FIGURE 6 shows an enlarged plan view of the support roller indexing apparatus;
FIGURE 7 shows a view in elevation of the details of a rack and pinion drive for the indexing mechanism of the support roller taken along line 7—7 in FIGURE 6.
FIGURE 8 shows a view in elevation of a pawl and ratchet device for the indexing mechanism of the support roller taken along line 8—8 in FIGURE 6;
FIGURE 9 shows a schematic view in elevation of the support roller in its extended or normal operating position, the support table, and the mandrel after the sheet material passing over these elements has been severed;
FIGURE 10 shows a schematic view in elevation of the support roller in its retracted position, the support table, and the mandrel while the slack end of the sheet material is extended to the mandrel;
FIGURE 11 shows a sectional view of a self-locking mandrel;
FIGURE 12 shows a pneumatic control diagram for the retractable roller and indexing mechanism; and
FIGURE 13 shows an electrical control diagram for the device.

Referring now to FIGURE 1 and 2, there is shown roll support means 21. A roll of sheet material 22 is mounted for free rotation upon support means 21. The sheet material from roll 22 extends under idler roller 23, across elongated table 24, through guide and alignment rollers 25, through trim rollers 26, around pull roller 27, idler roller 28, and guide roller 29, across support table 30, over retractable roller 31 onto collection mandrel 32. The prime mover of the entire device is basically pull roller 27 which is rotated by a conventional, variable speed motor 33. Collection mandrel 32 is notatably mounted on suitable support means and operated by a conventional, variable speed motor 34 through suitable transmission means 35. Table 24 is provided with graduated scales 36 which may be located on both sides thereof. These scales 36 will be more fully described later. If desired, a slitting mechanism (not shown) may be installed at some point "downstream" of the guide rollers 25.

Referring now to FIGURES 3 to 5, the retractable support roller and cooperating table 30 are shown in detail. Support roller 31 is rotatably mounted and supported in suitable bearings between rails 37. Cross brace 38 holds rails 37 in spaced relationship. Rails 37 pass through slide supports 39 and 40 on each side of table 30. Slide supports 39 are U-shaped and have the open part of the U facing inwardly toward each other to allow cross brace 38 to pass therethrough when roller 31 and rails 37 are retracted. Slide supports 40 surround the periphery of rails 37 to provide guide means therefor. Material guide 41 overlies table 30. Material guide 41 usually is provided with upstanding, sheet material, side guide portions. Rail guide supports 39 and 40 are supported upon legs 42. Legs 42 are interconnected by side braces 43, rear brace 44, and front brace 45.

The under side of each rail 37 is provided with a rack 46. Each rack 46 is engaged by a pinion 47. Pinions 47 are mounted on a shaft 48 which is supported by bearings 49 and 50. Bearings 49 are supported by pedestals 51 which rest on side braces 43. Bearings 50 are supported on pedestals 52. Pedestals 52 rest on central brace 53 which extends between front brace 45 and rear brace 44. A pinion 54 is mounted centrally on shaft 48. A rack 55 underlies and engages pinion 54. Rack 55 is supported by central brace 53. Pneumatic piston 56 is mounted on central brace 53. The rod 57 of piston 56 is secured to rack 55 which is slidably supported between guides 58 on central brace 53. Thus, it is apparent that when rack 55 is moved in the direction of front brace 45, rails 37 and roller 31 will retract and be moved in a direction toward brace 44 due to the rotation of pinion 54, shaft 48, and pinions 47 which engage racks 46. The length of movement of the roller 31 may be on the order of 18 inches, for example.

One of rails 37 has proximity switches PS1 and PS2 mounted thereon. Each of these proximity switches PS1 and PS2 is electrically connected to motor 33 controlling the pull motor 27 and to motor 34 controlling the mandrel 32. Proximity switches PS1 and PS2 are of a conventional type and are sensitive to metallic substances. When switch PS1 senses a metallic object passing thereunder or adjacent thereto, it sends a signal to speed controllers to reduce the speed of both the motor 34 controlling mandrel 32 and motor 33 controlling pull roller 27. When proximity switch PS2 senses a metallic object, it sends a signal to the speed controllers of motors 33 and 34 to stop rotation thereof. It is apparent that when an inspector wishes to stop the movement of non-metallic sheet material over guide 41, he may place on said sheet material a metallic object such as a strip of metallic tape, for example, which will activate proximity switches PS1 and PS2 sequentially as it passes thereunder. It is to be understood that if metallic sheet material is undergoing treatment, other conventional sensing and control means may be used. For example, photoelectric cells, cooperating with perforations or lines on the sheet material may be used.

Roller 31 has a plurality of spaced, transverse channels 59 extending across the surface thereof. Automatic or manual cutting means such as a knife, for example, may be drawn through one of said channels to sever the sheet material which overlies said roller 31.

A sprocket 60 is affixed to one end of roller 31. A chain 61 extends around sprocket 60 and drivingly connects it with sprocket 62 which is secured to shaft 63 of the indexing mechanism. The details of the indexing mechanism are best shown in FIGURES 6, 7 and 8. Shaft 63 is rotatably mounted at one end thereof in bearing 64. Bearing 64 is attached to plate 65. Plate 65 is attached to cross brace 38. Bottom support plate 66 is connected to the lower end of plate 65. Plate 66 is also supported by vertical plate 67, which is in turn supported by cross brace 38. A ratchet 68 is mounted on shaft 63 adjacent but spaced from sprocket 62. An L-shaped pawl 69 is pivoted at the juncture of its legs about a point 70 on bracket 71 which is secured to plate 66. The long leg of L-shaped pawl 69 may be moved into and out of engagement with ratchet 68 by pivoting said pawl 69 about point 70. This is accomplished by connecting the end of the short leg of pawl 69 away from pivot point 70 to a U-shaped bracket attached to rod 72 of piston 73. The end of piston 73 opposite the rod 72 is rotatably mounted on support 74 as is apparent from FIGURE 8. Thus, actuation of pneumatic piston 73 serves to move pawl 69 into and out of engagement with ratchet 68.

Shaft 63 is connected to one side of a conventional one-way over-riding clutch 75. A shaft 76 is concentrically mounted on shaft 63 by means of conventional bearings. The shaft 76 is connected to the other side of clutch 75. Shaft 63 is supported at its other end in bearing 77. Bearing 77 is attached to plate 67. Pinion 78 is secured to shaft 76 between clutch 75 and bearing 77. Underlying and engaging pinion 78 is a rack 79 which is slidably supported on plate 66 between guide blocks 80. One end of rack 79 is attached to rod 81 of piston 82 which is secured to plate 66. When pawl 69 is moved out of range of engagement with any of the teeth on ratchet 68, the over-riding action of clutch 75 will allow shaft 63, ratchet 68 and sprocket 62 to be driven by chain 61 which is in turn driven by sprocket 60 and roller 31 in a counter-clockwise direction when viewed from the proximity switch side of roller 31 in response to the movement of sheet material from guide 41 over roller 31 to mandrel 32. Rotation of shaft 63 in a counter-clockwise direction will not affect or impart rotation to shaft 76 due to the over-riding action of clutch 75. Clutch 75 will not provide a positive driving connection between shaft 76 and shaft 63 unless shaft 76 is driven in a counter-clockwise direction at a speed greater than shaft 63 is rotating in a counter-clockwise direction, or unless shaft 76 is driven in a counter-clockwise direction while shaft 63 tends to rotate in a clockwise direction at any speed or unless shaft 63 is stationary and shaft 76 is rotating in a counter-clockwise direction. Thus, normal movement of the sheet material will cause roller 31 to rotate in a counter-clockwise direction as the sheet material passes from guide 41 over roller 31 to mandrel 32. This counter-clockwise rotation of roller 31 will be imparted to shaft 63 through sprocket 60, chain 61, and sprocket 62. No rotation is imparted to shaft 76 due to the free-wheeling action of clutch 75.

When the rotation of sheet material is stopped, as, for example, by the action of proximity switches PS1 and PS2, piston 82 may be energized to move rack 79 in a direction toward piston 82. This movement will rotate pinion 78 in a counter-clockwise direction. Since shaft 63 is now stationary, clutch 75 will lock as a result of the counter-clockwise movement of pinion 78 to provide a positive driving connection between shaft 76 and shaft 63. This action will rotate shaft 63, ratchet 68, sprocket 62, sprocket 60 (through chain 61), and roll 31 in a counter-clockwise direction. At the same time that piston 82 is energized, piston 73 may also be energized to move pawl 69 adjacent ratchet 68 whereby counter-clockwise rotation thereof will cause engagement of one of the ratchet teeth with the pawl 69. Since cylinder 74 is smaller than cylinder 82, it will operate first to move pawl 69 adjacent ratchet wheel 68. However, a time delay mechanism might be provided, if desired, to further delay actuation of cylinder 82 after cylinder 74 has been actuated. In any event, the number of teeth on the pawl and the number of channels in roller 31 may be the same and may be so related that when one of the teeth of ratchet 68 is engaged by pawl 69 and further rotation of shaft 63, sprockets 62 and 60, and roller 31 is prevented, one of the channels 59 in the roller 31 will be positioned at a predetermined location such as that shown by arrow A, for example. It is understood that this location may be varied. It is apparent that regardless of where the channels 59 may be positioned upon the termination of movement by the sheet material, the indexing mechanism including pistons 73 and 82, rack 79, pinion 78, shaft 76, clutch 75, shaft 63, ratchet 68, pawl 69, sprocket 62, etc., when actuated, will position one of the channels 59 in line with arrow A. As mentioned above, channels 69 may receive manual or automatic cutting means which may be drawn through said channels 59 to sever the sheet material thereover. Since one of the channels 59 may be positioned at the same reference point which is in line with arrow A through operation of the indexing mechanism, it is possible to ascertain with reasonable accuracy the length of sheet material in the device between the point in line with arrow A and the end of table 24 nearest thereto. It is only necessary to determine this length initially. Thereafter, the length of material between the point in line with arrow A and the nearest end of table 24 will be the same as long as the sheet material is in a taut condition between those two points. Further, the amount of material along the table is readily apparent from the graduations on scales 36. The scales 36 read in distances from the point in line with arrow A to points on table 24. In other words, the graduations of scales 36 are based on distances from the point in line with arrow A throughout the path of travel of the sheet material to particular points on table 24. Tables of 125 feet in length have been used. An inspector may readily note the length of material between the point in line with arrow A and any given point along the table by glancing at the graduations on scales 36.

Should the inspector desire to sever the sheet at some point, he will place a piece of metallic tape at a distance behind said point equal to the length of sheet material between the point in line with arrow A and proximity switch PS2 which may be on the order of 6 inches, for example. If desired, a transverse, straight edge (not shown) extending across table 24 may be mounted on a carriage which may be mounted for movement up and down the lenght of the table 24. A locater device (not shown) also may be mounted on said carriage at a distance behind said straight edge equal to the length of sheet material between point in line with arrow A and proximity switch PS2. This carriage device would facilitate the inspector's job of locating the point at which the sheet material is to be cut and the point at which the tape must be placed.

Assuming that the sheet has been cut off at a point in line with arrow A, the inspector will note and record the length of material between the point in the line with arrow A and his selected point by reference to the scales 36. These scales may also read in terms of square yards if sheet material of predetermined and constant widths are used. Several scales may be set up for sheet material of different widths. In any event, the sheet material is then advanced until the metallic tape is sensed by switch PS1 at which time movement of the sheet material will be slowed to "creep" speed. Thereafter, as the metallic tape passes under proximity switch PS2, movement of the sheet material will cease. The distance between proximity switches may be on the order of 18 inches, for example. Promixity switch PS2 is very accurate and will stop movement of the sheet material within approximately 1/8 of an inch after sensing the tape when the creep speed or movement of the sheet material is approximately 30 feet per minute, for example. Normal speed of the sheet material may be 120 feet, if desired.

In any event, when the tape is sensed by proximity switch PS2 and movement of the sheet material is stopped, the point on the sheet material originally selected by the inspector will now be in line with arrow A. The indexing mechanism is actuated, and one of the channels 59 is positioned in line with arrow A. The sheet goods are then severed at this point, and a determinable length of sheet material has therefore been rolled up on mandrel 32.

FIGURE 9 shows a schematic view of the roller 31 in its extended position and of the sheet material after severance by cutting means which have been drawn through a channel 59 which is in line with arrow A. The loose end of the sheet material on mandrel 32 may then be rolled up thereon and removed if desired.

FIGURE 10 shows a schematic view of roller 31 in its retracted position immediately following severance of the sheet material, as shown in FIGURE 9 for example. As will be apparent, the end of the sheet which was supported by roller 31 in its extended position has now become a slack portion which may be extended down to mandrel 32. This slack end may be overlapped by the free end of the material on the mandrel and held by friction between said free end and the material on said mandrel when said mandrel is actuated to again roll up material. However, the slack end of the sheet material remaining on roller 31 may be attached to a new mandrel of the self-locking type as shown in FIGURE 11, for example.

The self-locking mandrel as shown in FIGURE 11 comprises a body 32 having a longitudinal slot 83 therein. Slot 83 is teardrop-shaped in cross section and contains a longitudinal rod 84. The diameter of rod 84 is greater than the outlet opening of slot 83. Thus, rod 84 may not be removed from slot 83 through its opening in the surface of mandrel 32. Sheet material may be inserted in slot 83 wherein it will contact rod 84 and the surface of slot 83. As the mandrel 32 starts to rotate in the direction shown by the arrow, the sheet material tends to remain stationary. The relative movement between the surface of slot 83, rod 84, and the sheet material will cause rod 84 to frictionally wedge itself between the tapering walls of slot 83 and the sheet material whereby the sheet material will be retained in said slot as the mandrel rotates. Thus, sheet material will be collected upon mandrel 32. This type of self-locking mandrel is merely one example of many various types of mandrels which may be used.

Referring now to FIGURE 12, there is shown the pneumatic circuit diagram for cylinders 56, 73 and 82. It is to be understood that the pneumatic system shown herein is merely one example of a control system for the apparatus of the present invention, and that other equivalent systems performing the same function may be substituted therefor. Cylinder 56 contains piston 85 which is connected to rod 57. Piston 85 may move in cylinder 56 between rod end 86 and head end 87. Movement of piston 85 is controlled by a double solenoid, air control valve 88. Valve 88 contains a reciprocable, spool-shaped core 89 which has spaced ridges 90 and 91. Core 89 extends outwardly of valve 88 on both sides thereof. Solenoid 92 cooperates with the left-hand extension of core 89 to move said core to the left. Conversely, solenoid 93 cooperates with the right-hand extension of core 89 to move said core to the right as viewed in FIGURE 12. Conduit 94 is connected to a suitable source of pressure fluid, such as air for example. Conduit 95 connects conduit 94 to valve 88 centrally thereof between spaced ridges 90 and 91 on core 89. Conduit 96 connects the interior of valve 88 with the rod end 86 of air clyinder 56. Conduit 96 contains valve 97. Conduit 98 connects the interior of air valve 88 with conduit 96 between valve 97 and the juncture of conduit 96 and air control valve 88. Conduit 99 connects the interior of valve 88 with the head end 87 of air cylinder 56. Conduit 99 contains valve 100. Conduit 101 connects valve 88 to conduit 99 between valve 100 and the juncture of conduit 99 and air valve 88. Conduit 102 connects air valve 88 to venting means such as the atmosphere, for example. Conduit 103 connects the interior of valve 88 with conduit 102.

When solenoid 92 is energized and solenoid 93 is de-energized, core 89 is moved to the left to a position where ridge 90 overlies the entrances to conduit 98 and conduit 102 and where ridge 91 overlies the entrance to conduit 99. When core 89 is in this position, air pressure will be supplied through conduit 95 to conduit 96 and the head end of air cylinder 56. This position of core 89 also allows communication between head end 87 of air cylinder 56 through conduits 99, 101 and the interior of valve 88 to venting conduit 103. Since no pressure is available in the head end 87 and since said head end 87 is vented, a pressure differential will result between the rod end 86 and the head end 87 which will, in turn, cause piston 85 to move to head end 87 thereby retracting rod 57.

Conversely, when solenoid 93 is energized, and solenoid 92 is de-energized, core 89 will move to the right to a position where ridge 91 will overlie the entrances to conduits 101 and 103, and ridge 90 will overlie the entrance to conduit 96. In this case, air pressure will be supplied from conduit 95 through the interior of valve 88 to conduit 99 and head end 87. At the same time, rod end 86 will be vented through conduits 96, 98, the interior of valve 88 and conduit 102. The resulting pressure differential between rod end 86 and head end 87 causes movement of piston 85 toward rod end 86. This movement results in extension of rod 57.

Air cylinder 73 contains piston 104 which is connected to piston rod 72. Piston 104 is movable between head end 105 and rod end 106 of cylinder 73. Air cylinder 82 contains piston 107 which is connected to rod 81. Piston 107 is reciprocable in cylinder 82 between a rod end 108 and a head end 109. Movement of pistons 104 and 107 is controlled by air valve 110. The construction of air valve 110 is similar to that of valve 88 described above. Valve 110 has a reciprocable spool-shaped core 111 mounted therein. Core 111 has a pair of spaced ridges 112 and 113. Core 111 has opposite portions extending outwardly of valve 110. Solenoid 114 cooperates with the left-hand extending portion of core 111 to control movement thereof in a leftward direction. Conversely, solenoid 115 cooperates with the right-hand extending portion of core 111 to control movement thereof in a right-hand direction. Conduit 94 connects to the interior of valve 110 centrally thereof. Conduit 116 extends from the interior of valve 110 to the head end 105 of cylinder 73. Conduit 116 contains valve 117. Conduit 118 connects head end 109 of cylinder 82 to conduit 116 between cylinder 73 and valve 117. Conduit 119 connects the interior of valve 110 to conduit 116 between valve 117 and the juncture of conduit 116 and valve 110. Conduit 120 connects the interior of valve 110 and the rod end 106 of air cylinder 73. Conduit 120 contains valve 121. Conduit 122 connects rod end 108 of cylinder 82 to conduit 120 between valve 121 and the rod end 106 of cylinder 73. Conduit 123 connects the interior of valve 110 with conduit 120 at a point between valve 121 and the connection between conduit 120 and valve 110. Conduit 124 leads from the interior of valve 110 to venting means which may be the same as those mentioned above. Conduit 125 connects the interior chamber of valve 110 to conduit 124.

When solenoid 114 is energized and solenoid 115 is de-energized, core 111 moves to the left to a position where ridge 112 overlies the entrances to conduits 124 and 123 and where the ridge 113 overlies the entrance to conduit 116. In this position pressurized air may pass from conduit 94 through valve 110, conduit 120 to rod end 106 of cylinder 73 and through conduit 122 to the rod end 108 of cylinder 82. At the same time, the head end 105 of cylinder 73 and the head end 109 of cylinder 82 communicate with venting conduit 125 through valve 110, conduit 119, conduit 116, and conduit 118. Thus, a pressure differential is created across piston 107 and piston 104 which causes movement of said pistons toward their respective head ends, thereby retracting their respective piston rods.

When solenoid 114 is de-energized and solenoid 115 is energized, core 111 will move in a right-hand direction to a point where ridge 113 will overlie the entrances to conduits 125 and 119 and ridge 112 will overlie the entrance to conduit 120. In this position of the core 111, pressurized air may be communicated from conduit 94 through valve 110 and conduit 116 to head end 105 of cylinder 73 and through conduit 118 to head end 109 of cylinder 82. At the same time, the rod end 106 of cylinder 73 and the rod end 108 of cylinder 82 will be connected to venting conduit 124 by means of conduits 120, 122, 123 and valve 110. In this position of core 111, a pressure differential is created across pistons 104 and 107 to cause movement thereof toward rod ends 106 and 108 respectively, which movement will extend rod 72 and rod 81. Valves 97, 100, 117 and 121 may be adjusted to control the speed of pistons 85, 104, and 107 as desired.

The electrical circuit and control system for the pull roll motor, mandrel motor and solenoid valves will now be described in detail with reference to FIGURE 13. Conductors L1 and L2 are connected to a suitable source of power, not shown. Push button switch 126 is mounted in conductor L1 and must be closed to energize the remainder of the electrical circuit including all motors and solenoid valves. Conductor 127 leads from conductor L1 to normally-open switch 128. Conductor 129 leads from switch 128 to conductor L2 and contains a conventional, speed control mechanism 130 for mandrel motor 34 and mandrel 32. Holding coil 131 is connected to conductor 129 and to one terminal of normally-closed switch 132. The other terminal of switch 132 is connected by conductor 133 to conductor L2. Conductor 134 connects conductor 129 to conventional, speed control means 135 for pull roll motor 33, pull roll 27, and conductor L2. Conductor 136 connects conductor L1 to proximity switch PS1. Conductor 137 connects conductor 136 and proximity switch PS2. Conductor 138 connects proximity switch PS1 and conductor L2. Conductor 139 connects proximity switch PS2 to conductor 138. Thus, a circuit is established from conductor L1 through each proximity switch (PS1 and PS2) to conductor L2.

Proximity switch PS1 is operatively connected to speed control mechanism 130 through conductors 140 and 141. Similarly, switch PS1 is connected to speed control mechanism 135 through conductors 140 and 142. When proximity switch PS1 senses metallic object, it sends a signal to speed control mechanisms 130 and 135 to reduce the speed of mandrel motor 34 and pull roll motor 33 to a "creep" which may provide a sheet material speed on the order of 30 feet per minute, for example. Proximity switch PS2 is connected to speed control mechanism 130 by conduit conductor 143 and to speed control mechanism 135 by conductor 144. Proximity switch PS2 is connected to relay 145 by means of conductor 146. Relay coil 145 is connected to conductor L2 through conductor 147. Conductor 148 connects switch PS2 and solenoid 114 to conductor L2. Conductor 149 connects solenoid 150 to conductor 148 and conductor L2. Conductor 151 connects conductor 149 and timer 152 to conductor L2. Conductor 153 connects timer 152 and solenoid 92 to conductor L2. Conductor 154 connects conductor L1 to normally-open switch 155. Normally-open switch 155 is rigidly connected to normally-open switch 128 so that both switches may be in their normally-open positions simultaneously and so that only one of these switches may be closed at any given time. Conductor 156 connects switch 155 to normally-closed switch 157 which may be controlled by solenoid 150. Conductor 158 connects switch 157, solenoid 93, and conductor L2. Conductor 159 connects conductor 158, solenoid 115 and conductor L2.

A typical sequence of operation would be as follows. Assuming that roller 31 is retracted and a slack end of sheet material has been secured to mandrel 32, switches 126 and 128 are closed. This completes a circuit from conductor L1 through conductor 127, switch 128, conductor 129, speed control 130, and mandrel motor 34 to conductor L2 whereby mandrel motor 34 begins to rotate to wind up the sheet material. Simultaneously, a circuit is completed from conductor 129 through conductor 134, speed controller 135, pull roll motor 33 and conductor L2 whereby pull roll motor 33 begins to rotate to draw sheet material across the inspection table from supply roll 22. Once switch 128 is manually closed, it will be held in such position due to the holding coil 131, since the circuit is completed from conductor 129 through coil 131, normally-closed switch 132, conductor 133 to conductor L2. At the same time, a circuit is also completed from conductor 129 through conductor 151 and timer 152 to conductor L2. After a pre-determined time delay, timer 152 will complete a circuit through conductor 153 and solenoid 92 to conductor L2. Solenoid 92 is thereby energized to move valve core 89 of valve 88 to a position whereby piston rod 57 will be retracted, which in turn causes extension of roller 31 to its normal operating position. At this time, sheet material is being drawn across table 24 by pull roller 27. The sheet material coming off said pull roller 27 is also being drawn across table 30 and roller 31 by mandrel 32 to be collected thereon. It should be noted that at this time, switch 155 is in its normally-open position, and therefore, no circuit may be completed to solenoid 93 which controls retraction of roller 31 or to solenoid 114 which controls retraction of air cylinders 73 and 82.

Sheet material will continue to be drawn across the table and onto mandrel 32 until the control circuit is manually broken or until a metallic object such as metallic tape, for example, passes under proximity switches PS1 and PS2. These switches will sense the tape and will automatically stop motors 34 and 33 and energize the indexing mechanism to position one of the cutting channels 59 in the proper position in line with arrow A. It will be remembered from the discussion above, that when an inspector notes a particular point on the sheet material at which he desires the sheet material to be severed, he will place a piece of metallic tape a given distance behind such point equal to the length of sheet material between a channel 59 in position A and proximity switch PS2. Therefore, as the sheet material passes underneath the proximity switches, the metallic tape will first be sensed by switch PS1. As stated above, switch PS1 will send a signal to speed controler 130 for the mandrel motor 34 and also to the speed controller 135 for pull roll motor 33 to reduce the speed of said motors to a "creep." If, for example, the normal speed of movement of the sheet material through the device is approximately 120 feet per minute, the creep speed may be on the order of about 30 feet per minute. The sheet material will then move at a rate of 30 feet per minute while the metallic tape passes from switch PS1 to switch PS2. When the tape moves to position underlying switch PS2, said switch will sense the tape and will signal both speed controllers 130 and 135 immediately to stop rotation of motors 33 and 34, whereby movement of sheet material through the device is terminated. Movement of the sheet material may be stopped within approximately ⅛ of an inch of the point at which the tape was sensed by switch PS2.

Several other circuits are energized by switch PS2 at the same time that signals are sent to speed controllers 130 and 135. Switch PS2 momentarily completes a circuit through conductor 146, relay 145, conductor 147 to conductor L2. Relay 145 is thereby energized and normally-closed switch 132 is caused to open. When switch 132 is opened, the circuit through holding coil 131 is broken and switch 128 returns to its normally-open position. It is, therefore, apparent that no current may now pass through either the mandrel or pull roll motors without re-energization of the holding coil circuit without closing switch 128. In other words, no movement of the sheet material may take place without resetting switch 128. At the same time that switch PS2 was energizing the other circuits, it completes circuits to solenoid 150, controlling normally-closed switch 157, and solenoid 114 which controls valve core 111. Switch 157 is momentarily held in its open position by solenoid 150 to allow solenoid 114 to move core 111 to its left-hand position. While switch 157 is open, neither solenoid 93 nor 115 may be energized. When solenoid 114 moves core 111 to its left-hand position, air pressure is conducted into the rod end 108 of cylinder 82 and rod end 106 of cylinder 73, whereby pistons 107 and 104 will be retracted. This retraction will cause the indexing mechanism to operate in a manner described above. The indexing mechanism will cause one of the channels 59 to be positioned in line with arrow A. Thereafter, the sheet material may be severed by drawing cutting means through the channel 59 in line with arrow A. The sheet material will be severed at approximately the same point chosen by the inspector who had placed the metallic tape on the sheet material at a given distance behind this point equal to the length of the sheet material between the point in line with arrow A and proximity switch PS2.

After the cutting operation has been completed, normally-closed switch 157 will have returned to its normal position, completing a circuit between conductor 156 and conductor 158. At this time normally-open switch 155 is manually closed to complete a circuit between conductor 154 and conductor 156. Since switch 157 has been closed and conductor 158 energized, solenoids 93 and 115 will be energized. When solenoid 93 is energized, valve core 89 is moved to its right-hand position which results in extension of piston 85 and rod 57 and retraction of roller 31. This action provides a slack end of sheet material extending over roller 31. This slack end of sheet material may be suitably attached to the mandrel 32 in a manner noted above. At the same time that solenoid 93 was energized, solenoid 115 was also energized. Energization of solenoid 115 results in movement of valve core 111 to its right-hand position. With core 111 in such a position, air pressure is applied to the head end 109 of cylinder 82 and head end 105 of cylinder 73. This air pressure results in extension of piston rods 72 and 81 which in turn move the indexing mechanism to its normally inoperative position and frees roller 31 for movement in response to movement of sheet material.

At this time the cutting operation has been completed, and the pull roll and mandrel motors 33 and 34, respectively, may be restarted to again draw material across inspection table 24 and support table 30. This is accomplished by closing normally-open switch 128. Closing of switch 128 completes the circuits which were described above. It should be noted that at this time, switch 155 will remain in its normally-open position.

Although the main reason for retracting roller 31 is to provide a slack end of material remaining over said roller for connection to mandrel 32, retraction of said roller 31 also provides a greater work area around mandrel 32 so that it may be removed from its mountings in an easy manner should the operation so require. If desired, a mechanized system for removing a mandrel from the sheet material collected thereon may be provided. One example of such a mechanism would be to provide a vertically reciprocable table immediately beneath the mandrel 32. The mandrel could be mounted on its pedestals by means of conventional clutches, for example, which could be released to allow the mandrel and collected sheet material to be raised by the underlying, reciprocable table. Once mandrel 32 was free of its mountings, mechanical means such as a chain drive mechanism, for example, might be provided to engage one end of said mandrel to unlock and withdraw it from the sheet material. After the mandrel is withdrawn from the sheet material, the sheet material might be removed from the raised table. Then the mandrel could be replaced upon the raised table in line with its normal operating position. The table would then be lowered and the ends of the mandrel would be receivable by clutch means on the mounting pedestals, at which time the slack end of sheet material extending over roller 31 would be secured to the self-locking portions of mandrel 32. This is merely one example of a mechanism to facilitate loading and unloading of sheet material from the mandrel, and other devices may be used.

It is apparent that metallic tape may be placed at any point along the length of the table. Thus, the length of material which may be selected by the inspector to be collected by the mandrel 32 may be varied greatly.

The apparatus of the present invention therefore provides means for accurately inspecting lengths of sheet material which may be severed from a supply of said material of indeterminate length. The present invention also provides means whereby the length and area of severed material may be determined in a relatively accurate manner. The device of the present invention also provides a roller having a cutting channel which is perpendicular to the length of sheet material whereby the sheet material when cut will have straight and salable ends. Manual control means may be provided for any and/or all of the components of the device.

It is to be understood that the device of the present invention is not limited to the specific example including dimensions and speeds shown and described herein. For example, the electrical and pneumatic circuits may be varied. Hydraulic actuation circuits may be used. Equivalent control circuits and actuating means may be provided. Various modifications of the present invention will occur to those skilled in the art without departing from the scope and spirit of the invention as defined in the claims.

I claim:

1. An indexing mechanism comprising a first shaft, means for rotatably mounting said first shaft, stop means associated with said first shaft, cooperating means engagable with said stop means to prevent rotation of said first shaft in one direction, means to actuate said cooperating means, a second shaft, means for rotatably mounting said second shaft, one-way clutch means connecting said shafts whereby said clutch means will be engaged to provide a positive driving connection between said shafts when said second shaft is rotating in said one direction at a rate greater than the rate said first shaft may tend to rotate in said one direction but will be disengaged to allow said first shaft to freely override said second shaft when said cooperating means are not engaged with said stop means and when said first shaft is rotating in said one direction at a rate greater than the rate said second shaft may be rotating in said one direction or in another direction at any rate, means to selectively rotate said first shaft in said one direction and means to selectively rotate said second shaft in said one direction and in the direction opposite thereto.

2. An indexing mechanism according to claim 1 wherein said stop means comprise ratchet means secured to said first shaft, said engagable means comprise pawl means, said actuation means include first piston means connected to said pawl means whereby said pawl means may be moved to a position adjacent to said ratchet means, and said means to rotate said second shaft include pinion means secured to said second shaft, rack means engaging said pinion means, and second piston means connected to said rack means.

3. An indexing mechanism according to claim 2 further comprising control means for controlling movement of said first and second piston means and said means to rotate said first shaft whereby rotation of said first shaft may be terminated, said first and second piston means may be actuated to cause said pawl means to move to a position adjacent said ratchet means, said rack to rotate said pinion and said second shaft in said one direction to engage said clutch means and cause rotation of said first shaft and ratchet means in said one direction so that said ratchet means will become engaged with said pawl means at which point further rotation of said shafts is prevented by said pawl means and whereby thereafter, said first and second piston means may be actuated to cause said pawl means to disengage said ratchet means, said rack to return to its initial position while rotating said pinion in a direction opposite to said one direction, and said first shaft to again be rotated in said one direction without affecting rotation of said second shaft due to the overriding action of said one-way clutch.

4. Sheet material trimming and inspection apparatus comprising base means, material support means mounted on said base means, said support means including rotatable roller means having at least one transverse slot therein through which cutting means may be drawn, means for selectively moving sheet material over said support and roller means, means for sensing at least one predetermined point on said sheet material, control means responsive to said sensing means and associated with said material moving means to stop movement of the material over said support and roller means when said point is sensed, and indexing means responsive to said sensing means to rotate asid roller means so that said slot therein will be moved to a predetermined reference position when said point is sensed.

5. Sheet material trimming and inspection apparatus according to claim 4 wherein said sensing means include proximity switch means associated with said support means and located adjacent the sheet material passing thereover, said sheet material having marker means at said one predetermined point, said marker means causing said sensing means to be actuated when said marker means passes over said support means in adjacent relation to said sensing means.

6. Sheet material trimming and inspection apparatus according to claim 5 wherein said support means have a material inlet portion and a material outlet portion, said roller means being located at said outlet portion, wherein said support means include means to retractably mount said roller means and means to selectively move said roller means between an extended and a retracted position, said means for moving said material include supply means for providing a source of sheet material at said inlet position, and wherein said sheet material maving means include mandrel means adjacent but spaced from said roller means at said outlet portion for drawing sheet material over said support means, said roller means being retractable after said material, which overlies said slot and said roller means when said slot is located in said predetermined reference position, has been cut to provide slack in the end of said sheet material remaining over said roller and support means so that said end may reach and be retained by said mandrel means for further drawing operations, said support means and said roller means being extendable to a normal operating position after said remaining end of said material is retained by said mandrel means and said mandrel means begins a subsequent drawing operation.

7. Sheet material trimming and inspection apparatus according to claim 4 wherein said indexing means include piston operated stop means and piston operated roller rotating means.

8. Sheet material trimming and inspection apparatus according to claim 4 wherein said sensing means include proximity switch means associated with said support means and located adjacent the sheet material passing thereover, said sheet material having marker means at said one predetermined point, said marker means causing said sensing means to be actuated when said marker means passes over said support means in adjacent relation to said sensing means, and wherein said sheet material supply means include sheet material dispensing means and elongated table support means for said sheet material which table support means are located between said dispensing means and said inlet portion of said support means, said elongated table support means including graduated indicator means along the length thereof for measurement of the length and area of said sheet material between said predetermined reference position of said slot and any point throughout the length of said elongated table support means whereby a determinable amount of sheet material may be easily measured and severed from said sheet material supply means after said marker means have been placed at said predetermined point on said sheet material corresponding to a selected length of material as shown by said indicator means, said sheet material has been cut at said slot when said slot is located at said reference position, said roller has been retracted, said slack end retained by said mandrel means, said mandrel means actuated to draw said sheet material over said support means until said marker means pass adjacent said switch means to actuate said switch means, said control means, and said index means whereby said slot again will be located at said reference position to allow cutting means to be passed therethrough severing the selected amount of material which has been drawn onto said mandrel means.

9. Sheet material trimming and inspection apparatus comprising base means, material support means mounted on said base means, said support means including roller means having at least one transverse slot therein through which cutting means may be drawn, means for selectively moving sheet material over said support and roller means, means for sensing at least one predetermined point on said sheet material, control means responsive to said sensing means and associated with aid material moving means to stop movement of the material over said support and roller means when said point is sensed, and indexing means responsive to said sensing means to index said roller means so that said slot therein will be moved to a predetermined reference position when said point is sensed, said indexing means including a first shaft, means for rotatably mounting said first shaft, stop means associated with said first shaft, cooperating means engageable with said stop means to prevent rotation of said first shaft in one direction, means to actuate said cooperating means, a second shaft, means for rotatably mounting said second shaft, one-way clutch means connecting said shafts whereby said clutch means will be engaged to provide a positive driving connection between said shafts when said second shaft is rotating in said one direction at a rate greater than the rate said first shaft may tend to rotate in said one direction but will be disengaged to allow said first shaft to freely override said second shaft when said cooperating means are not engaged with said stop means and when said first shaft is rotating in said one direction at a rate greater than the rate said second shaft may be rotating in said one direction or in another direction at any rate, means to selectively rotate said first shaft in said one direction and means to selectively rotate said second shaft in said one direction and in the direction opposite thereto.

10. Sheet material trimming and inspection apparatus according to claim 9 wherein said stop means comprise ratchet means secured to said first shaft, said engagable means comprise pawl means, said actuation means include first piston means connected to said pawl means whereby said pawl means may be moved to a position adjacent to said ratchet means, and said means to rotate said second shaft include pinion means secured to said second shaft, rack means engaging said pinion means, and second piston means connected to said rack means.

11. Sheet material trimming and inspection apparatus according to claim 10 further including control means for controlling movement of said first and second piston means and said means to rotate said first shaft whereby rotation of said first shaft may be terminated, said first and second piston means may be actuated to cause said pawl means to move to a position adjacent said ratchet means, said rack to rotate said pinion and said second shaft in said one direction to engage said clutch means and cause rotation of said first shaft and ratchet means in said one direction so that said ratchet means will become engaged with said pawl means at which point further rotation of said shafts is prevented by said pawl means and whereby thereafter, said first and second piston means may be actuated to cause said pawl means to disengage said ratchet means, said rack to return to its initial position while rotating said pinion in a direction opposite to said one direction, and said first shaft to again be rotated in said one direction without affecting rotation of said second shaft due to the overriding action of said one-way clutch.

References Cited by the Examiner
UNITED STATES PATENTS

| | | | |
|---|---|---|---|
| 2,091,522 | 8/1937 | Perry | 26—70 X |
| 2,715,941 | 8/1955 | Rankin et al. | 83—557 X |
| 2,779,413 | 1/1957 | Gage | 83—367 |
| 2,781,092 | 2/1957 | Madsen | 83—367 |
| 2,995,958 | 8/1961 | Jungeling et al. | 74—813 |
| 3,120,861 | 2/1964 | Finlay et al. | 83—371 X |
| 3,170,340 | 2/1965 | Froehlich | 74—813 |

WILLIAM W. DYER, Jr., *Primary Examiner.*

L. B. TAYLOR, *Assistant Examiner.*